(12) United States Patent
Albertus et al.

(10) Patent No.: US 9,935,342 B2
(45) Date of Patent: Apr. 3, 2018

(54) LI/METAL BATTERY WITH SHAPE CHANGE CONTROL

(71) Applicant: Robert Bosch GmbH, Stuttgart (DE)

(72) Inventors: Paul Albertus, Washington, DC (US); John F. Christensen, Mountain View, CA (US); Timm Lohmann, Mountain View, CA (US); Boris Kozinsky, Waban, MA (US)

(73) Assignee: Robert Bosch GmbH, Stuttgart (DE)

( * ) Notice: Subject to any disclaimer, the term of this patent is extended or adjusted under 35 U.S.C. 154(b) by 703 days.

(21) Appl. No.: 14/459,767

(22) Filed: Aug. 14, 2014

(65) Prior Publication Data

US 2015/0048783 A1    Feb. 19, 2015

Related U.S. Application Data

(60) Provisional application No. 61/866,079, filed on Aug. 15, 2013.

(51) Int. Cl.

| | |
|---|---|
| *H01M 10/44* | (2006.01) |
| *H01M 10/48* | (2006.01) |
| *H01M 10/052* | (2010.01) |
| *H01M 2/34* | (2006.01) |
| *H01M 4/134* | (2010.01) |
| *H01M 4/1395* | (2010.01) |
| *H01M 4/40* | (2006.01) |

(Continued)

(52) U.S. Cl.
CPC ......... *H01M 10/445* (2013.01); *H01M 2/345* (2013.01); *H01M 4/134* (2013.01); *H01M 4/1395* (2013.01); *H01M 4/405* (2013.01); *H01M 10/052* (2013.01); *H01M 10/4235* (2013.01); *H01M 10/48* (2013.01); *H02J 7/0029* (2013.01); *H01M 2200/20* (2013.01)

(58) Field of Classification Search
CPC .... H01M 2/345; H01M 10/445; H01M 4/134; H01M 4/1395; H01M 4/405; H01M 10/052; H01M 10/4235; H01M 10/48

See application file for complete search history.

(56) References Cited

U.S. PATENT DOCUMENTS

| | | |
|---|---|---|
| 5,628,973 A | 5/1997 | Nishimura et al. |
| 2010/0285339 A1 | 11/2010 | Chaturvedi et al. |

(Continued)

FOREIGN PATENT DOCUMENTS

| | | |
|---|---|---|
| FR | 2972857 A1 | 9/2012 |
| WO | 2012170873 A2 | 12/2012 |

OTHER PUBLICATIONS

Supplementary European Search Reporting corresponding to European Patent Application 14 83 6723 (8 pages).

(Continued)

*Primary Examiner* — Oi K Conley
(74) *Attorney, Agent, or Firm* — Maginot, Moore & Beck LLP

(57) ABSTRACT

An electrochemical battery system in one embodiment includes a first electrochemical cell including an anode with a form of lithium, a first plurality of pressure sensors positioned and configured to sense localized variations in pressure along the anode, a memory in which command instructions are stored, and a processor configured to execute the command instructions to (i) identify an indication of a variation in localized pressure along the anode, and (ii) selectively control the first electrochemical cell based upon the identified indication.

18 Claims, 5 Drawing Sheets

(51) Int. Cl.
*H01M 10/42* (2006.01)
*H02J 7/00* (2006.01)

(56) References Cited

U.S. PATENT DOCUMENTS

2012/0270077 A1 10/2012 Koetting
2012/0270126 A1 10/2012 Matsumoto et al.
2012/0280692 A1 11/2012 Park

OTHER PUBLICATIONS

International Search Report and Written Opinion corresponding to PCT Application No. PCT/US2014/051085, dated Nov. 28, 2014 (9 pages).
Christensen J. et al., "A Critical Review of Li/air Batteries", Journal of the Electrochemical Society, 2012. 159(2): p. R1-R30.
Amatucci, G.G. et al., "Fluoride based electrode materials for advanced energy storage devices", Journal of Fluorine Chemistry, 2007. 128(4): p. 243-262.
Cabana, J. et al., "Beyond Intercalation-Based Li-Ion Batteries: The State of the Art and Challenges of Electrode Materials Reacting Through Conversion Reactions", Advanced Materials, 2010. 22(35): p. E170-E192.
USABC Goals for Advanced Batteries for EVs. 2002, United States Advanced Battery Consortium. http://www.uscar.org/commands/files_download.php?files_id=27.
Ogasawara, T. et al., "Rechargeable $Li_2O_2$ Electrode for Lithium Batteries", Journal of the American Chemical Society, 2006. 128(4): p. 1390-1393.
Abraham, K.M. et al., "A polymer electrolyte-based rechargeable lithium/oxygen battery", Journal of the Electrochemical Society, 1996. 143(1): p. 1-5.
Zheng, J. et al., "Theoretical Energy Density of Li—Air Batteries", Journal of the Electrochemical Society, 2008. 155(6): p. A432-A437.
Beattie, S. et al., "High-Capacity Lithium—Air Cathodes", Journal of the Electrochemical Society, 2009. 156: p. A44-A47.
Kumar, B. et al., "A Solid-State, Rechargeable, Long Cycle Life Lithium—Air Battery", Journal of the Electrochemical Society, 2010. 157: p. A50-A54.
Read, J., "Characterization of the lithium/oxygen organic electrolyte battery", Journal of the Electrochemical Society, 2002. 149: p. A1190-A1195.
Read, J. et al., "Oxygen transport properties of organic electrolytes and performance of lithium/oxygen battery", Journal of the Electrochemical Society, 2003. 150: p. A1351-A1356.
Yang, X. et al., "The effect of oxygen pressures on the electrochemical profile of lithium/oxygen battery", Journal of Solid State Electrochemistry:, 2010 (14), p. 109-114.

LI/METAL BATTERY WITH SHAPE CHANGE CONTROL

CROSS REFERENCE

This application claims the benefit of U.S. Provisional Application No. 61/866,079 filed Aug. 15, 2013, the entire contents of which is herein incorporated by reference.

FIELD OF THE DISCLOSURE

The present disclosure relates to batteries and more particularly to lithium-metal batteries.

BACKGROUND

Batteries are a useful source of stored energy that can be incorporated into a number of systems. Rechargeable lithium-ion ("Li-ion") batteries are attractive energy storage systems for portable electronics and electric and hybrid-electric vehicles because of their high specific energy compared to other electrochemical energy storage devices. In particular, batteries with a form of lithium metal incorporated into the negative electrode afford exceptionally high specific energy (measured in Wh/kg) and energy density (measured in Wh/L) compared to batteries with conventional carbonaceous negative electrodes.

When high-specific-capacity negative electrodes such as lithium are used in a battery, the maximum benefit of the capacity-increase over conventional systems is realized when a high-capacity positive electrode active material is also used. Conventional lithium-intercalating oxides (e.g., $LiCoO_2$, $LiNi_{0.8}Co_{0.15}Al_{0.05}O_2$, and $Li_{1.1}Ni_{0.3}Co_{0.3}Mn_{0.3}O_2$) are typically limited to a theoretical capacity of ~280 mAh/g (based on the mass of the lithiated oxide) and a practical capacity of 180 to 250 mAh/g. In comparison, the specific capacity of lithium metal is about 3863 mAh/g. The highest theoretical capacity achievable for a lithium-ion positive electrode is 1168 mAh/g (based on the mass of the lithiated material), which is shared by $Li_2S$ and $Li_2O_2$. Other high-capacity materials including $BiF_3$ (303 mAh/g, lithiated) and $FeF_3$ (712 mAh/g, lithiated) are identified in Amatucci, G. G. and N. Pereira, *Fluoride based electrode materials for advanced energy storage devices*. Journal of Fluorine Chemistry, 2007. 128(4): p. 243-262. All of the foregoing materials, however, react with lithium at a lower voltage compared to conventional oxide positive electrodes, hence limiting the theoretical specific energy. The theoretical specific energies of the foregoing materials, however, are very high (>800 Wh/kg, compared to a maximum of ~500 Wh/kg for a cell with lithium negative and conventional oxide positive electrodes).

Thus the advantage of using a Li metal negative electrode (sometimes referred to as an anode) is the much higher energy density of the entire cell, as compared to cells with graphitic or other intercalation negative electrode. A disadvantage of using pure Li metal is that lithium is highly reactive. By way of example, FIG. 1 is a schematic of an electrochemical cell 10 including an anode 12 including a form of lithium, a cathode 14, and a separator 16 in a fully charged state. A tab 18 provides electrical connection to the anode 12 while a tab 20 provides electrical connection to the cathode 14. As the cell 10 discharges, the lithium in the anode 12 moves to the cathode 14 resulting in the configuration of FIG. 2 in a discharged state. In FIG. 2, the anode 12 has very little lithium remaining.

In the ideal case the plating and stripping of the Li metal would be completely uniform such that the thickness of the Li metal across the length of the cell would be uniform. In practice the current density in the cell is non-uniform. One reason for this is the tabs 18 and 20 that distribute the electronic current across the electrode surfaces create electronic pathways of different lengths, thereby encouraging a non-uniform current distribution. Another reason is that temperature gradients create non-uniform local resistance to the flow of current, which will then distribute according to the lowest resistance pathway and in a non-uniform manner.

The result of a non-uniform current density is a non-uniform thickness of Li metal, which is shown graphically in FIG. 3. In FIG. 3, the Li metal is thicker at either end of the cell and thinner in the middle. The specific shape shown in FIG. 3 is meant to be indicative of the types of shape change that can occur, but other shapes are also recognized, including shapes in which one side is thicker than the other, and so on. The changing thickness of the Li metal may also lead to a changing thickness of other cell layers, including the separator and the cathode layers. In addition, while FIG. 3 shows all of the cell layers maintaining coherent interfaces, the layers may also partly separate as a result of shape changes, which in general is deleterious to cell performance.

Additionally, the lithium metal has a propensity to undergo morphology changes, which cause structures having a high surface area to form on and around the negative electrode when the cell is being charged. Exemplary high surface area structures include dendrites and mossy structures.

Dendrites are the most common failure mode for cells with Li metal anodes. The dendrites form with a needle-like structure and can grow through the separator during charging of the cell, resulting in an internal short. "Soft shorts" that burn out rapidly result in a temporary self-discharge of the cell, while "strong shorts" consisting of a higher, more stable contact area can lead to complete discharge of the cell, cell failure, and even thermal runaway. While dendrites typically grow through the separator during charge, shorts can also develop during discharge depending on the external pressure placed on the cell and/or internal volume changes that occur in both the negative and positive electrodes.

Because Li metal is highly electronically conductive, the surface of the Li tends to roughen as the metal is plated and stripped. Peaks in the surface grow as dendrites during charge. During discharge, some smoothing of the dendrites occurs. Nonetheless, there is typically some roughness that remains at the end of discharge. Depending on the depth of discharge, the overall roughness can be amplified from one cycle to the next. Because the metal is essentially at the same electrochemical potential throughout, potential and, to a lesser extent, concentration gradients in the electrolyte phase drive the change in morphology.

What is needed, therefore, is a battery system that reduces the potential for dendrite formation and the undesired morphological changes in the anode of battery cells having metal anodes.

SUMMARY

In accordance with one embodiment an electrochemical battery system includes a first electrochemical cell including an anode with a form of lithium, a first plurality of pressure sensors positioned and configured to sense localized variations in pressure along the anode, a memory in which command instructions are stored, and a processor configured to execute the command instructions to (i) identify an indication of a variation in localized pressure along the anode, and (ii) selectively control the first electrochemical cell based upon the identified indication.

In one or more of the embodiments, an electrochemical battery system further includes a second plurality of pressure sensors positioned and configured to sense localized variations in pressure along the cathode, wherein the processor is further configured to execute the command instructions to identify an indication of a variation in localized pressure along the cathode.

In one or more of the embodiments, the first plurality of pressure sensors is placed directly against the anode.

In one or more of the embodiments, the first electrochemical cell is one of a plurality of electrochemical cells, the system further including a housing enclosing the plurality of cells, wherein the first plurality of pressure sensors is positioned on an inner surface of the housing.

In one or more of the embodiments, the processor is further configured to execute the command instructions to identify a maximum pressure within the first electrochemical cell using input from the first plurality of pressure sensors, compare the identified maximum pressure to a first threshold, and stop operation of the first electrochemical cell when the identified maximum pressure exceeds the first threshold.

In one or more of the embodiments, the processor is further configured to execute the command instructions to compare the identified indication of a variation in localized pressure to a predetermined range, and selectively charge or discharge the first electrochemical cell when the identified indication of a variation in localized pressure is outside of the predetermined range.

In one or more of the embodiments, the processor is further configured to execute the command instructions to selectively discharge the first electrochemical cell when the identified indication of a variation in localized pressure is outside of the predetermined range.

In one or more of the embodiments, the processor is further configured to execute the command instructions to selectively completely discharge the first electrochemical cell when the identified indication of a variation in localized pressure is outside of the predetermined range.

In one or more of the embodiments, the processor is further configured to execute the command instructions to selectively discharge the first electrochemical cell to a second electrochemical cell when the identified indication of a variation in localized pressure is outside of the predetermined range.

In accordance with one embodiment, a method of operating an electrochemical battery system includes positioning a first plurality of sensors along an anode of an electrochemical cell with a form of lithium in the anode, sensing localized variations in pressure along the anode with the first plurality of sensors, identifying, by executing program instructions stored within a memory with a processor, an indication of a variation in localized pressure along the anode using inputs from the first plurality of sensors, and controlling the first electrochemical cell, by executing the program instructions with the processor, based upon the identified indication of a variation in localized pressure along the anode.

In accordance with one or more embodiments, the method of operating an electrochemical battery system includes positioning a second plurality of sensors along a cathode of the electrochemical cell, sensing localized variations in pressure along the cathode with the second plurality of sensors, identifying, by executing the program instructions with the processor, an indication of a variation in localized pressure along the cathode using inputs from the second plurality of sensors, and controlling the first electrochemical cell, by executing the program instructions with the processor, based upon the identified indication of a variation in localized pressure along the cathode.

In accordance with one or more embodiments, positioning the first plurality of sensors includes positioning the first plurality of sensors directly against the anode.

In accordance with one or more embodiments, the method of operating an electrochemical battery system includes enclosing a plurality of electrochemical cells within a housing, the plurality of cells including the first electrochemical cell, wherein positioning the first plurality of sensors includes positioning the first plurality of sensors directly against an inner surface of the housing.

In accordance with one or more embodiments, the method of operating an electrochemical battery system includes identifying a maximum pressure within the first electrochemical cell using input from the first plurality of pressure sensors by executing the program instructions with the processor, comparing the identified maximum pressure to a first threshold by executing the program instructions with the processor, and stopping operation of the first electrochemical cell by executing the program instructions with the processor when the identified maximum pressure exceeds the first threshold.

In accordance with one or more embodiments, the method of operating an electrochemical battery system includes comparing the identified indication of a variation in localized pressure to a predetermined range by executing the program instructions with the processor, and selectively charging or discharging the first electrochemical cell when the identified indication of a variation in localized pressure is outside of the predetermined range by executing the program instructions with the processor.

In accordance with one or more embodiments, the method of operating an electrochemical battery system includes selectively discharging the first electrochemical cell when the identified indication of a variation in localized pressure is outside of the predetermined range by executing the program instructions with the processor.

In accordance with one or more embodiments, selectively discharging includes selectively completely discharging the first electrochemical cell when the identified indication of a variation in localized pressure is outside of the predetermined range by executing the program instructions with the processor.

In accordance with one or more embodiments, the method of operating an electrochemical battery system includes selectively discharging the first electrochemical cell to a second electrochemical cell when the identified indication of a variation in localized pressure is outside of the predetermined range by executing the program instructions with the processor.

BRIEF DESCRIPTION OF THE DRAWINGS

FIG. 6 depicts a schematic an electrochemical cell of FIG. 5 including pressure sensors along the length of the cathode and the anode. In some embodiments an enclosure (not shown) is used. In other embodiments, the pressure sensors are very thin (e.g., <5 microns) and integrated directly into a stack of cells;

DESCRIPTION

Figures 1, 2:
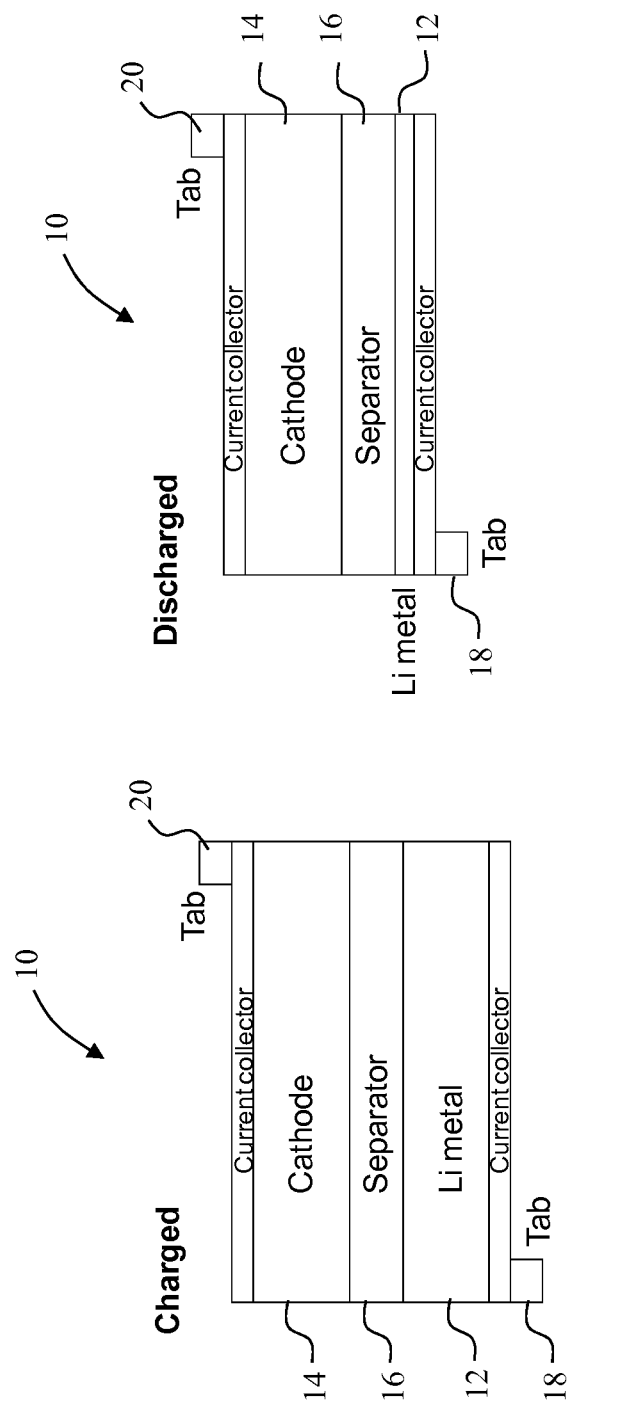
FIG. 1 depicts a simplified schematic showing the layers that may be contained within a cell containing Li metal in a charged condition.
FIG. 2 depicts the cell of FIG. 1 in a discharged condition showing the volume change (especially of the Li metal) that takes place during the charge and discharge process.
Figure 3:
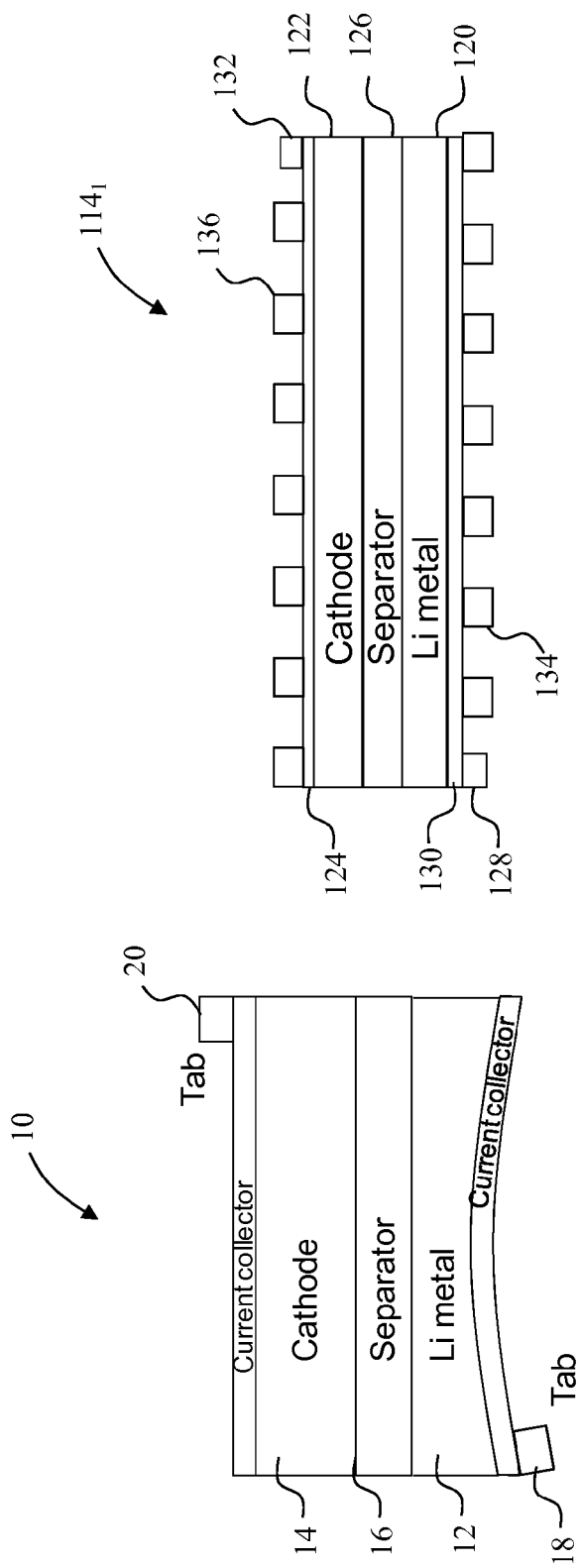
FIG. 3 depicts a schematic showing the result of a non-uniform current density resulting in a non-uniform Li metal thickness, and thereby a non-uniform cell thickness.

For the purpose of promoting an understanding of the principles of the disclosure, reference will now be made to the embodiments illustrated in the drawings and described in the following written description. It is understood that no limitation to the scope of the disclosure is thereby intended. It is further understood that the present disclosure includes any alterations and modifications to the illustrated embodiments and includes further applications of the principles of the disclosure as would normally occur to one of ordinary skill in the art to which this disclosure pertains.

Figure 4:
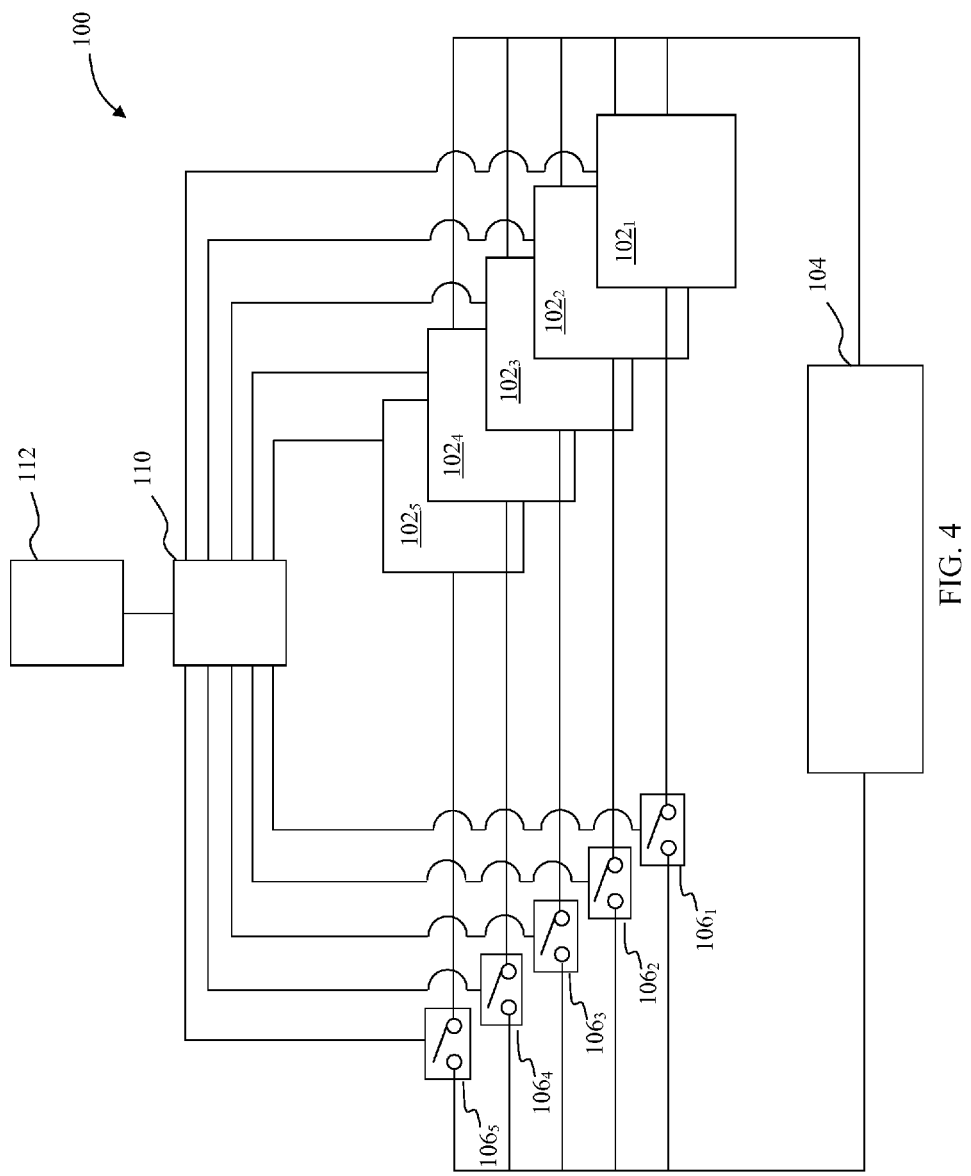
FIG. 4 depicts a simplified schematic of a battery system including several electrochemical cell packs which can be independently controlled for charging or discharging operations.

FIG. 4 depicts a battery system 100 including several lithium metal battery cell packs $102_x$. In the embodiment of FIG. 4, five battery cell packs $102_{1-5}$ are depicted. In alternative embodiments, more or fewer battery cell packs of different or the same chemistry may be provided. Each of the lithium metal battery cell packs $102_x$ is selectively connected to a load or voltage source 104 through a respective switch $106_x$. Each of the switches $106_x$ are controlled by a processor 110 which is operably connected to a memory 112. Various command instructions, discussed in further detail below, are programmed into the memory 112. The processor 110 is operable to execute the command instructions programmed into the memory 112.

Figure 5:
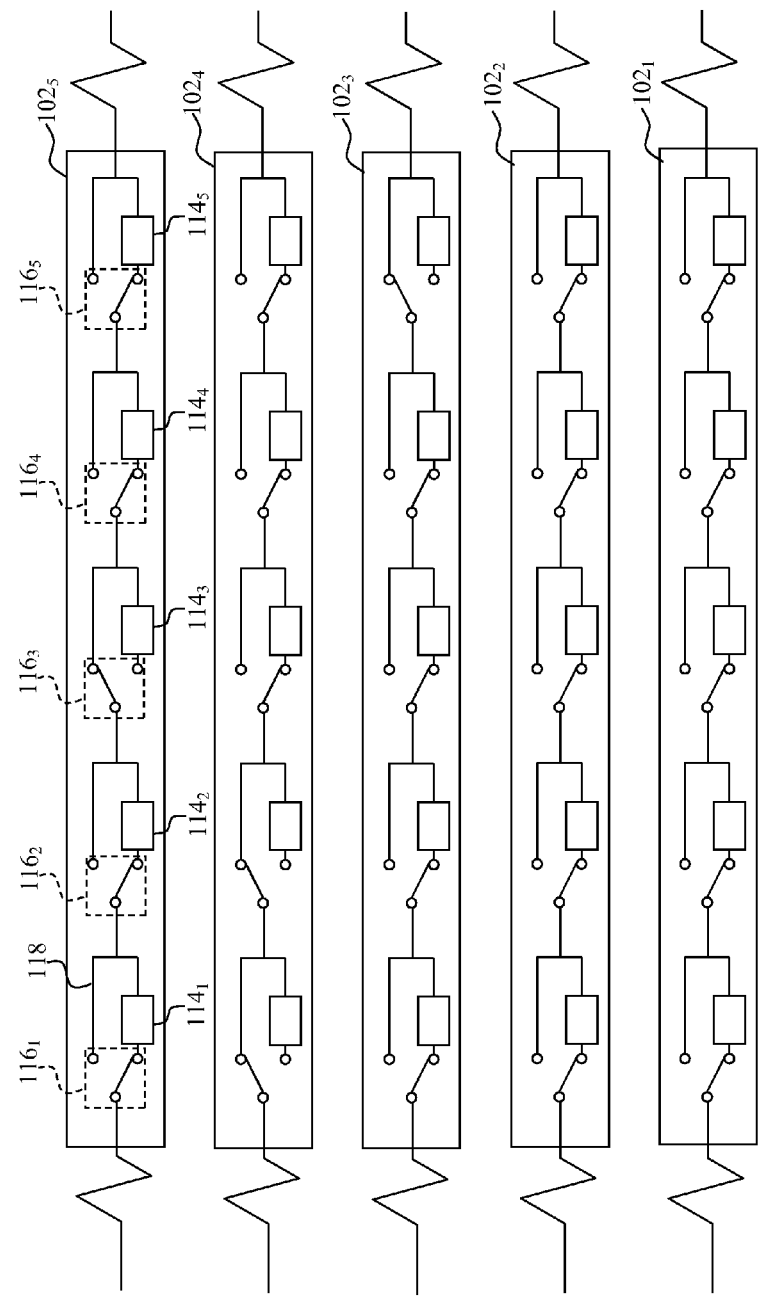
FIG. 5 depicts a simplified schematic of the cell packs of FIG. 4 showing the independently controlled connection switches for each of the electrochemical cells within the electrochemical cell packs.

The lithium metal battery cell packs $102_x$ in this embodiment are identical and are described in further detail with reference to FIG. 5 and the lithium metal battery cell pack $102_5$. The lithium metal battery cell pack $102_5$ includes five lithium metal battery cells $114_{1-5}$. A two-way connection switch $116_{1-5}$ is associated with each of the battery cells $114_{1-5}$. The connection switches $116_{1-5}$, which are independently controlled by the processor 110 (control lines are omitted for clarity), can alternatively connect the respective battery cells $114_{1-5}$ to an internal battery cell circuit 118 or bypass the respective battery cell $114_{1-5}$. In FIG. 2, the connection switches $116_{1, 2, 4, and 5}$ are positioned to connect the respective battery cells $114_{1, 2, 4, and 5}$ to the battery cell circuit 118 while the connection switch $116_3$ is positioned to a bypass position whereby the respective battery cell $114_3$ is effectively electrically isolated from the battery cell circuit 118.

The lithium metal battery cells $114_{1-5}$ in this embodiment are identical and are described in further detail with reference to the lithium metal battery cell $114_1$ shown in FIG. 6. The lithium metal cell $114_1$ includes. The electrochemical cell $114_1$ includes an anode 120, a cathode 122 with an aluminum current collector 124, and a separator 126. The anode 120 includes lithium metal or a lithium alloy metal, or other desired metal, and is in electrical communication with a tab 128 through a current collector 130.

The cathode 122 in various embodiments includes a sulfur or sulfur-containing material (e.g., PAN-S composite), an air electrode, or any other active material or blend of materials that react with and/or insert Li cations and/or electrolyte anions. In some embodiments, the cathode 122 includes Li-conducting liquid, gel, polymer, or other solid electrolyte. Materials in the cathode 122 may further include lithium conducting garnets such as NCM-garnet, $LiNi_{0.5}Mn_{1.5}O_4$-garnet mixtures, lithium conducting sulfides or phosphates, $Li_3N$, $Li_3P$, LIPON. Other materials in the cathode 122 may include electronically conductive additives such as carbon black, and a binder material. The cathode materials are selected to allow sufficient electrolyte-cathode interfacial area for a desired design. The cathode is in electrical communication with a tab 132 through the current collector 124. In some embodiments, one or both of the current collectors 124/130 are omitted.

A number of pressure sensors 134 are located along the length of the anode 120 while another plurality of pressure sensors 136 are located along the length of the cathode 122. As depicted in FIG. 6, current collectors 124 and 130 are positioned between the anode 120 and cathode 122 and the respective pressure sensors 134/136. In embodiments without one or more of the current collectors 124/130, the pressure sensors are placed directly against the anode/cathode. This configuration of pressure sensors is particularly useful for two-sided or bipolar designs. In this scheme the pressure sensors can be located on every layer, or alternate over some specified number of cell layers, so long as the pressure sensors are integrated directly among the cell layers. Extra separator or other cell layers may be inserted with cutout regions in which the pressure sensors are located so that the pressure sensors do not disturb the good contact among all of the layers.

The purpose of the pressure sensors 134 and 136 is to provide an indication as to the local thickness of the lithium metal in the anode 120. As the thickness in a particular area of the anode 120 increases, the corresponding pressure sensor will register an increase in pressure. Consequently, regions where the pressure is highest have the thickest Li metal, while regions with the lowest pressure have the thinner Li metal. The variation in pressure thus indicates uneven buildup of Li metal.

Figure 7:
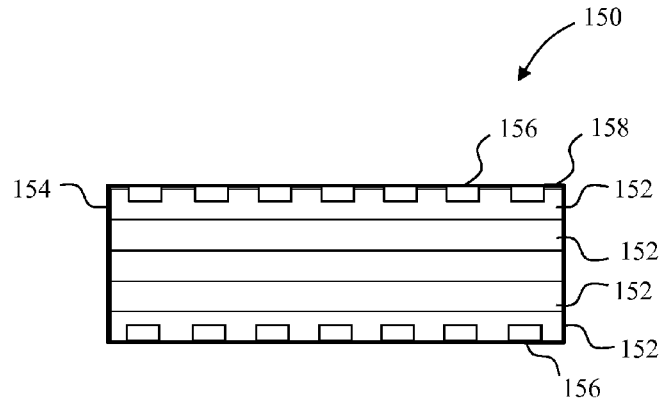
FIG. 7 depicts a schematic of a cell stack showing pressure sensors within a stiff enclosure that contains numerous cells. The pressure sensors can also be located on the surface of an enclosure that has some flexibility and contains numerous cells.

Rather than each individual cell including sets of pressure sensors, in some embodiments multiple cells are monitored with a set of pressure sensors. For example, FIG. 7 depicts a cell stack 150 which includes a number of cells 152 within a housing 154. A number of pressure sensors 156 are located on an inner surface of the housing 154. The cells 152 may be substantially the same as the cell $114_1$. The housing 154 is relatively stiff and may be may be a metal or composite case. Alternatively, the housing could be flexible to provide some resistance to swelling of the cells 152. In the embodiment of FIG. 7, the pressure sensors 156 are not provided within the cell layers 152. Nonetheless, they are positioned to provide data regarding the localized pressure conditions within the cells 152.

In a further embodiment (not shown) the pressure sensors are located on an outer surface of a flexible housing and configured to detect shape changes of the housing. A flexible enclosure may be a pouch.

Regardless of the particular positioning of the pressure sensors, once information on the local pressure is obtained over the surface of a cell or collection of cells, an algorithm is used to act on that information. The algorithm in one embodiment is stored in the memory 112 and the processor 110 is configured to receive pressure data from the pressure sensors and to execute command instructions including the algorithm. Thresholds for various control actions are also stored in the memory.

Figure 8:
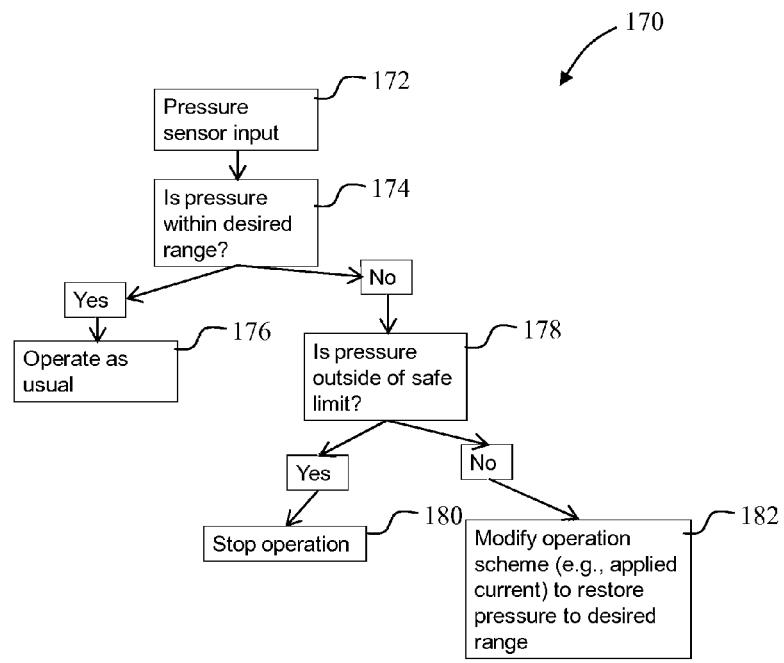
FIG. 8 depicts a simplified schematic of a control strategy that uses pressure sensor input to control charging and discharging of a cell to reduce uneven lithium deposition in an anode.

FIG. 8 depicts a process 170 for controlling the system 100 using a stored algorithm. At block 172, the processor receives pressure data from the pressure sensors 134 and 136. At block 174, the obtained pressures are compared to stored values. If the pressures are within an acceptable range, battery operations continue at block 176. In some embodiments, the upper limit of the range is a high pressure limit. In other embodiments, the range is an allowed variation or difference between the obtained pressures, and a separate absolute value is provided as an upper pressure limit.

If the pressures are not within the desired range at block 174, the processor determines if an emergency pressure threshold has been exceeded at block 178. If the emergency pressure is exceeded, operation of the cell $114_x$ is terminated at block 180.

If the pressure has exceeded the desired pressure range at block 174 but has not yet exceeded the emergency pressure sensor at block 178, then the controller operates the cell $114_x$ to restore the pressure to the desired range at block 182.

Different control strategies may be used in different embodiments to effect a return to a desired pressure range. In one embodiment, the cell $114_x$ is controlled to fully strip the lithium from the anode 120 (full discharge). For example the cell $114_x$ is fully discharged in one embodiment by selectively discharging the cell $114_x$ to another cell in the battery system 100 or to preferentially supply an external load.

Depending upon operational constraints which may also be incorporated into the control algorithm, the processor may instead of complete discharge only discharge to a deep level. This may be used to ameliorate the uneven lithium deposition.

In some embodiments, the processor may control the cell $114_x$ to provide current pulses to establish a non-uniform current density in the cell $114_x$ for preferential removal of Li metal from specific areas of the cell $114_x$, thereby improving the uniformity of the Li metal.

The above described steps may be taken while the battery is plugged into an electrical outlet by the user, as the restoration of a uniform thickness of Li metal may involve several discharge and charge steps. However, operation schemes can also be envisioned while a vehicle is in operation. For example, during regenerative braking (charging), the current may be modulated to improve the uniformity of the current density and thereby the uniformity of the Li metal thickness to keep it within a specified range.

The above described embodiments reduce or reverse deleterious Li metal shape change. By incorporating pressure sensors that monitor Li metal shape change, the disclosed embodiments identify when the shape of the Li metal is outside the desired range as detected by the pressure, and modifies the operating strategy to restore a uniform shape. The shape is returned to a uniform shape in a different ways for different embodiments. In some embodiments, a complete stripping cycle of Li metal (when a current collector is used in addition to the Li metal, such as copper) is effected while in other embodiments, a series of current pulses that result in a non-uniform current density is used to restore a uniform Li metal shape. Some embodiments use combinations of the strategies described above.

The disclosed embodiments thus enable the use of Li metal, which offers a higher energy content than batteries that do not include Li metal, by providing a strategy that addresses the problem of shape change that occurs with Li metal during cycling associated with non-uniform current densities.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

The invention claimed is:

1. An electrochemical battery system, comprising:
   a first electrochemical cell including an anode with a form of lithium;
   a first plurality of pressure sensors positioned along the anode and configured to sense localized variations in pressure along the anode;
   a memory in which command instructions are stored; and
   a processor operably connected to the first plurality of sensors and the memory and configured to execute the command instructions to (i) identify an indication of a variation in localized pressure along the anode using the sensed localized variations in pressure, (ii) selectively control the first electrochemical cell based upon the identified indication, (iii) identify a maximum pressure within the first electrochemical cell using input from the first plurality of pressure sensors, (iv) compare the identified maximum pressure to a first threshold, (v) stop operation of the first electrochemical cell when the identified maximum pressure exceeds the first threshold, (vi) compare the identified indication of a variation in localized pressure to a predetermined range, and (vii) selectively initiate charge or discharge the first electrochemical cell when the identified indication of a variation in localized pressure is outside of the predetermined range.

2. The system of claim 1, further comprising:
   a second plurality of pressure sensors positioned and configured to sense localized variations in pressure along a cathode of the first electrochemical cell, wherein the processor is operably connected to the second plurality of sensors and is further configured to execute the command instructions to identify an indication of a variation in localized pressure along the cathode.

3. The system of claim 1, wherein the first plurality of pressure sensors is placed directly against the anode.

4. The system of claim 1, wherein the first electrochemical cell is one of a plurality of electrochemical cells, the system further including:
   a housing enclosing the plurality of cells, wherein the first plurality of pressure sensors is positioned on an inner surface of the housing.

5. The system of claim 1, wherein the processor is further configured to execute the command instructions to:

selectively initiate discharge the first electrochemical cell when the identified indication of a variation in localized pressure is outside of the predetermined range.

6. The system of claim 5, wherein the processor is further configured to execute the command instructions to:
selectively completely discharge the first electrochemical cell when the identified indication of a variation in localized pressure is outside of the predetermined range.

7. The system of claim 5, wherein the processor is further configured to execute the command instructions to:
selectively initiate discharge of the first electrochemical cell to a second electrochemical cell when the identified indication of a variation in localized pressure is outside of the predetermined range.

8. A method of operating an electrochemical battery system, comprising:
positioning a first plurality of sensors along an anode of an electrochemical cell with a form of lithium in the anode;
sensing localized variations in pressure along the anode with the first plurality of sensors;
identifying, by executing program instructions stored within a memory with a processor, an indication of a variation in localized pressure along the anode using inputs from the first plurality of sensors; and
controlling the first electrochemical cell, by executing the program instructions with the processor, based upon the identified indication of a variation in localized pressure along the anode
identifying a maximum pressure within the first electrochemical cell using input from the first plurality of pressure sensors by executing the program instructions with the processor;
comparing the identified maximum pressure to a first threshold by executing the program instructions with the processor; and
stopping operation of the first electrochemical cell by executing the program instructions with the processor when the identified maximum pressure exceeds the first threshold
comparing the identified indication of a variation in localized pressure to a predetermined range by executing the program instructions with the processor; and
selectively initiating charging or discharging the first electrochemical cell when the identified indication of a variation in localized pressure is outside of the predetermined range by executing the program instructions with the processor.

9. The method of claim 8, further comprising:
positioning a second plurality of sensors along a cathode of the electrochemical cell;
sensing localized variations in pressure along the cathode with the second plurality of sensors;
identifying, by executing the program instructions with the processor, an indication of a variation in localized pressure along the cathode using inputs from the second plurality of sensors; and
controlling the first electrochemical cell, by executing the program instructions with the processor, based upon the identified indication of a variation in localized pressure along the cathode.

10. The method of claim 8, wherein positioning the first plurality of sensors comprises:
positioning the first plurality of sensors directly against the anode.

11. The method of claim 8, further comprising:
enclosing a plurality of electrochemical cells within a housing, the plurality of cells including the first electrochemical cell, wherein positioning the first plurality of sensors comprises:
positioning the first plurality of sensors directly against an inner surface of the housing.

12. The method of claim 8, further comprising:
selectively initiating discharging the first electrochemical cell when the identified indication of a variation in localized pressure is outside of the predetermined range by executing the program instructions with the processor.

13. The method of claim 12, wherein selectively initiating discharging comprises:
selectively completely discharging the first electrochemical cell when the identified indication of a variation in localized pressure is outside of the predetermined range by executing the program instructions with the processor.

14. The method of claim 8, further comprising:
selectively initiating discharging the first electrochemical cell to a second electrochemical cell when the identified indication of a variation in localized pressure is outside of the predetermined range by executing the program instructions with the processor.

15. An electrochemical battery system, comprising:
a first electrochemical cell including an anode with a form of lithium;
a first plurality of pressure sensors positioned along the anode and configured to sense localized variations in pressure along the anode;
a memory in which command instructions are stored; and
a processor operably connected to the first plurality of sensors and the memory and configured to execute the command instructions to (i) identify an indication of a variation in localized pressure along the anode using the sensed localized variations in pressure, (ii) compare the identified indication of a variation in localized pressure to a predetermined range, and (vii) selectively initiate charge or discharge the first electrochemical cell when the identified indication of a variation in localized pressure is outside of the predetermined range.

16. The system of claim 15, wherein the processor is further configured to execute the command instructions to:
selectively initiate discharge the first electrochemical cell when the identified indication of a variation in localized pressure is outside of the predetermined range.

17. The system of claim 16, wherein the processor is further configured to execute the command instructions to:
selectively completely discharge the first electrochemical cell when the identified indication of a variation in localized pressure is outside of the predetermined range.

18. The system of claim 16, wherein the processor is further configured to execute the command instructions to:
selectively initiate discharge of the first electrochemical cell to a second electrochemical cell when the identified indication of a variation in localized pressure is outside of the predetermined range.

* * * * *